(12) United States Patent
Seo et al.

(10) Patent No.: US 12,106,453 B2
(45) Date of Patent: Oct. 1, 2024

(54) IMAGE PROCESSING APPARATUS INCLUDING PRE-PROCESSOR AND NEURAL NETWORK PROCESSOR AND OPERATING METHOD THEREOF

(71) Applicant: SAMSUNG ELECTRONICS CO., LTD., Suwon-si (KR)

(72) Inventors: Youngil Seo, Suwon-si (KR); Irina Kim, Suwon-si (KR); Seongwook Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 17/902,464

(22) Filed: Sep. 2, 2022

(65) Prior Publication Data

US 2023/0071368 A1    Mar. 9, 2023

(30) Foreign Application Priority Data

Sep. 3, 2021 (KR) .................. 10-2021-0117943
Jun. 15, 2022 (KR) .................. 10-2022-0073065

(51) Int. Cl.
*G06T 5/70* (2024.01)
*G06T 5/73* (2024.01)

(52) U.S. Cl.
CPC .............. *G06T 5/70* (2024.01); *G06T 5/73* (2024.01); *G06T 2207/20084* (2013.01)

(58) Field of Classification Search
CPC .... G06T 5/70; G06T 5/60; G06T 5/73; G06T 2207/20084; H04N 23/843
See application file for complete search history.

(56) References Cited

U.S. PATENT DOCUMENTS

| | | | |
|---|---|---|---|
| 8,358,319 B2 | 1/2013 | Cote et al. | |
| 8,571,312 B2 | 10/2013 | Chang et al. | |
| 9,344,690 B2 | 5/2016 | Nowozin et al. | |
| 10,735,698 B2* | 8/2020 | Siddiqui | ............... G02B 5/201 |
| 2014/0056513 A1* | 2/2014 | Grossmann | ............... G06T 3/10 |
| | | | 382/162 |
| 2017/0374299 A1* | 12/2017 | Liu | ..................... H04N 1/6008 |

(Continued)

FOREIGN PATENT DOCUMENTS

| | | |
|---|---|---|
| KR | 10-1803471 B1 | 12/2017 |
| KR | 10-2212442 B1 | 2/2021 |
| WO | WO-2018207059 A1 * 11/2018 | ........... H04N 13/161 |

OTHER PUBLICATIONS

Kim et al., "Deep Image Demosaicing for Submicron Image Sensors", Society for Imaging Science and Technology, Dec. 17, 2019, [DOI: 10.2352/J.ImagingSci.Technol.2019.63.6.060410], (12 pages total).

(Continued)

*Primary Examiner* — Timothy J Henn
(74) *Attorney, Agent, or Firm* — Sughrue Mion, PLLC

(57) ABSTRACT

An image processing apparatus includes a pre-processor configured to receive, from an image sensor, input image data including a pattern corresponding to a filter array of the image sensor, and generate reconstructed image data by reconstructing the input image data based on phase information corresponding to each of a plurality of pixels of the image sensor, and a neural network processor configured to generate output image data based on the input image data and the reconstructed image data.

20 Claims, 10 Drawing Sheets

(56) References Cited

U.S. PATENT DOCUMENTS

| | | | |
|---|---|---|---|
| 2019/0045115 A1* | 2/2019 | Ishihara | H04N 25/702 |
| 2021/0006755 A1* | 1/2021 | Kim | G06T 3/4046 |
| 2021/0241429 A1 | 8/2021 | Pan et al. | |
| 2023/0069744 A1* | 3/2023 | Lee | H04N 9/67 |

OTHER PUBLICATIONS

Kwan et al., "Further Improvement of Debayering Performance of RGBW Color Filter Arrays Using Deep Learning and Pansharpening Techniques", Journal of Imaging, Aug. 1, 2019, doi: 10.3390/jimaging5080068, (14 pages total).

Chung et al., "Effective Three-Stage Demosaicking Method for RGBW CFA Images Using The Iterative Error-Compensation Based Approach", MDPI, Jul. 14, 2020, doi: 10.3390/s20143908, (12 pages total).

* cited by examiner

IMAGE PROCESSING APPARATUS INCLUDING PRE-PROCESSOR AND NEURAL NETWORK PROCESSOR AND OPERATING METHOD THEREOF

CROSS-REFERENCE TO RELATED APPLICATIONS

This application is based on and claims priority under 35 U.S.C. § 119 to Korean Patent Application No. 10-2021-0117943, filed on Sep. 3, 2021, and Korean Patent Application No. 10-2022-0073065, filed on Jun. 15, 2022, in the Korean Intellectual Property Office, the disclosures of which are incorporated by reference herein in their entireties.

BACKGROUND

1. Field

The disclosure relates generally to an image processing apparatus that performs an image processing operation by using a pre-processor and a neural network processor, and an operating method thereof.

2. Description of Related Art

The demand for high-quality photos and images has recently increased, and image processing on image data generated by an image sensor may be efficiently performed by a neural network processor. Deep learning, machine learning, etc., for image processing may be implemented with a neural network.

When image processing on image data is performed by a neural network processor, defects, such as false color, may occur, and the quality of an image may be reduced. Accordingly, there is a demand for technology for outputting a high-quality image without defects when performing image processing on image data.

SUMMARY

Provided are an image processing apparatus for increasing quality of image data output therefrom by reconstructing image data input to a neural network processor and performing an image processing operation by using the neural network processor, and an operating method thereof.

Additional aspects will be set forth in part in the description which follows and, in part, will be apparent from the description, or may be learned by practice of the presented embodiments.

According to an aspect of an example embodiment, an image processing apparatus may include a pre-processor configured to receive, from an image sensor, input image data including a pattern corresponding to a filter array of the image sensor, and generate reconstructed image data by reconstructing the input image data based on phase information corresponding to each of a plurality of pixels of the image sensor, and a neural network processor configured to generate output image data based on the input image data and the reconstructed image data.

According to an aspect of an example embodiment, an image processing apparatus may include an image sensor including a plurality of pixels and a filter array in which the plurality of pixels are arranged, the image sensor configured to generate input image data including a pattern corresponding to the filter array, a pre-processor configured to generate reconstructed image data by reconstructing the input image data based on phase information corresponding to each of the plurality of pixels and the pattern corresponding to the filter array, and neural network processor configured to generate output image data based on the input image data and the reconstructed image data. The pre-processor may be further configured to determine a unit of the reconstructed image data based on the pattern corresponding to the filter array, and generate the reconstructed image data comprising the determined unit based on the input image data.

According to an aspect of an example embodiment, an operating method of an image processing apparatus may include receiving input image data including a pattern corresponding to a filter array in which a plurality of pixels are arranged, generating reconstructed image data by reconstructing the input image data based on phase information corresponding to each of the plurality of pixels, and generating output image data based on the input image data and the reconstructed image data by using a neural network processor configured to perform preset image processing operations.

BRIEF DESCRIPTION OF THE DRAWINGS

The above and other aspects, features, and advantages of certain example embodiments of the present disclosure will be more apparent from the following description taken in conjunction with the accompanying drawings, in which.

DETAILED DESCRIPTION

Hereinafter, embodiments of the disclosure will be described in detail with reference to the accompanying drawings.

A neural network processor may be used to perform image processing on image data generated by an image sensor. Deep learning, machine learning, or so on may be performed for the image processing based on a neural network.

The neural network processor may be trained to perform image processing operations such as a remosaic operation, a demosaicing operation, a denoising operation, and a deblurring operation. When image data is input to the neural network processor, and the neural network processor performs image processing such as the remosaic operation or the demosaicing operation on the image data, defects such as false color may occur, and the quality of an image quality may be reduced.

Provided is an image processing apparatus that may cause input image data (e.g., image data generated by an image sensor) and reconstructed image data to be input to a neural network processor. The reconstructed image data may be obtained by reconstructing the input image data based on phase information and a pattern. The reconstructed image may have a smaller size than the input image data, and may be classified to include a phase element of one attribute.

The input image data and the reconstructed image data may be input to a neural network processor, and the neural network processor may extract outstanding characteristics of the input image data and the reconstructed image data. Accordingly, performance of the neural network processor may be improved, defects may be greatly reduced during an image processing operation, and thus, a high-resolution and high-quality image may be generated. The image processing apparatus may improve the performance of the neural network processor by applying different weighted values to input image data for each level of the neural network processor.

Figure 1:
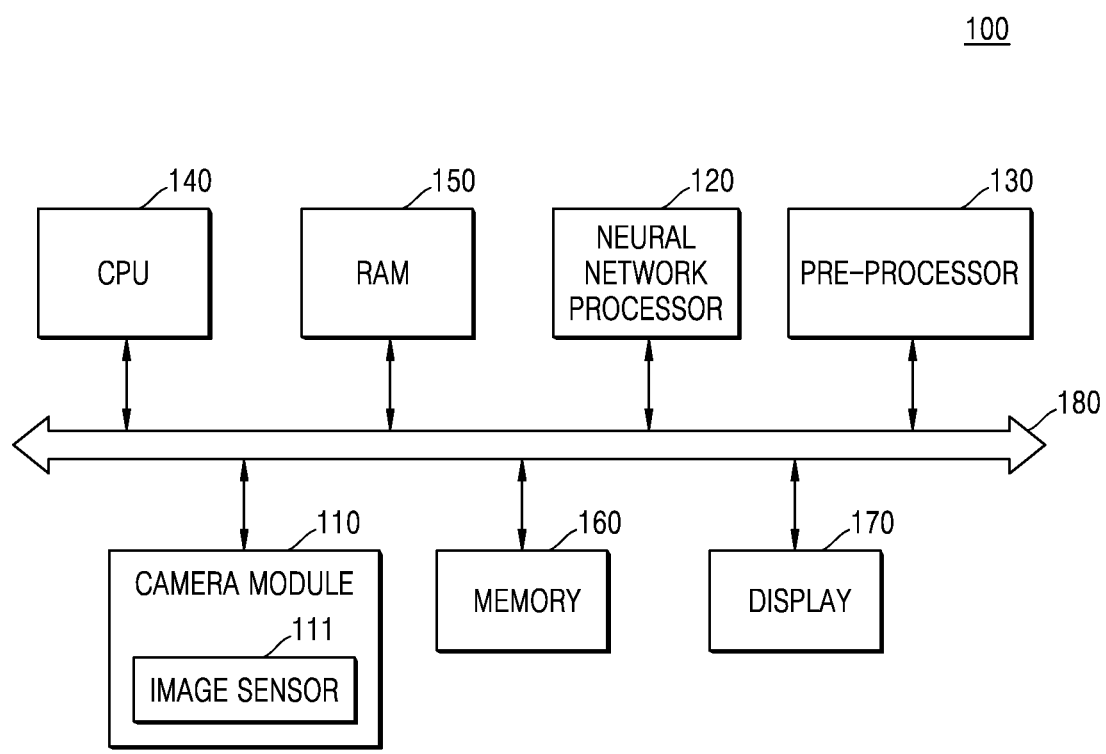
FIG. 1 is a block diagram illustrating a neural network system according to an example embodiment.

FIG. 1 is a block diagram illustrating a neural network system according to an example embodiment.

A neural network system 100 may infer information included in input data by training (or learning) a neural network or analyzing the input data by using the neural network. The neural network system 100 may determine a situation based on the inferred information or may control configurations of an electronic device on which the neural network system 100 is mounted. For example, the neural network system 100 may be applied to a smartphone, a tablet device, a smart television (TV), an augmented reality (AR) device, Internet of Things (IoT), an autonomous vehicle, robotics, a medical device, a drone, an advanced driver assistance system (ADAS), an image display device, a measurement device, and so on, which perform voice recognition, image recognition, image classification, image processing, and so on by using a neural network, and the neural network system 100 may be mounted on one of various types of electronic devices. In an embodiment, the neural network system 100 of FIG. 1 may include an application processor. Hereinafter, the neural network system 100 may be applied to an image processing apparatus and is mainly described on configurations in which image processing operations on image data of a camera module 110 may be performed.

Referring to FIG. 1, the neural network system 100 may include the camera module 110, a neural network processor (or a neural network device) 120, a pre-processor 130, a central processing unit (CPU) 140, random access memory 150, a memory 160, and a display 170. The neural network system 100 may further include an input/output module, a security module, a power control device, and so on and may further include various types of processors.

In embodiments, some or all of components of the neural network system 100 may be formed in one semiconductor chip. For example, the neural network system 100 may be implemented as a system on chip (SoC) and may be referred to as an image chip or so on in some embodiments. Components of the neural network system 100 may communicate with each other via a bus 180.

The CPU 140 may control all operations of the neural network system 100. The CPU 140 may include one processor core (a single core) or a plurality of processor cores (a multi-core). The CPU 140 may process or execute programs and/or data stored in a storage region, such as the memory 160, by using the RAM 150.

For example, the CPU 140 may execute an application program and control the neural network processor 120 to perform neural network-based tasks required according to the execution of the application program. The neural network may be a neural network model based on at least one of an artificial neural network (ANN), a convolution neural network (CNN), a region with CNN (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, a plain residual network, a dense network, a hierarchical pyramid network, and a fully convolutional network. In addition, the type of neural network model is not limited to the above-described examples.

The neural network processor 120 may perform a neural network operation based on received input data. Furthermore, the neural network processor 120 may generate an information signal based on a result of performing a neural network operation. The neural network processor 120 may include a neural network operation accelerator, a coprocessor, a digital signal processor (DSP), an application specific integrated circuit (ASIC), a field-programmable gate array (FPGA), a graphics processing unit (GPU), a neural processing unit (NPU), a tensor processing unit (TPU), a multi-processor system-on-chip (MPSoC), and so on.

The camera module 110 may image an object (or a subject) outside the neural network system 100 and may generate image data. For example, the camera module 110 may include an image sensor 111. The image sensor 111 may convert an optical signal of the object into an electrical signal by an optical lens. To this end, the image sensor 111 may include a pixel array in which a plurality of pixels are two-dimensionally arranged. For example, one of a plurality of reference colors may be assigned to each of the plurality of pixels. For example, the plurality of reference colors may include red, green, blue (RGB), or red, green, blue, and white (RGBW).

The camera module 110 may generate image data by using the image sensor 111. The image data may be variously referred to as an image frame or frame data. Hereinafter, image data generated by the image sensor 111 may be referred to as input image data. The input image data may be provided as input data to the neural network processor 120 or the pre-processor 130 or may be stored in the memory 160. The input image data stored in the memory 160 may be provided to the pre-processor 130 or the neural network processor 120.

The pre-processor 130 according to an embodiment may receive input image data from the camera module 110 or the memory 160 and reconstruct the input image data to generate image data. Hereinafter, the image data generated by the pre-processor 130 may be referred to as reconstructed image data. The pre-processor 130 may reconstruct the input image data based on phase information corresponding to the plurality of pixels. The pre-processor 130 may perform a reconstruction operation on the input image data to improve the performance of the neural network processor 120.

The reconstruction operation performed on the input image data may refer to an operation of classifying the input image data based on phase information and converting units of the input image data. For example, the pre-processor 130 may generate reconstructed image data by converting input image data having a tetra pattern to have a unit different from the tetra pattern unit. A detailed description of the reconfiguration operation performed by the pre-processor 130 is provided below with reference to FIGS. 3 to 5.

The pre-processor 130 may perform a pre-processing operation and a reconstruction operation on the input image data. For example, the pre-processing operation may include at least one of a bad pixel correction operation, a lens shading correction operation, a crosstalk correction operation, and a white balance correction operation.

The neural network processor 120 according to an embodiment may receive the reconstructed image data from the pre-processor 130 and perform a neural network operation based thereon. The neural network processor 120 may receive input image data from the camera module 110 or the memory 160 and perform a neural network operation based thereon.

The neural network processor 120 may receive the reconstructed image data and the input image data to perform a neural network operation. The neural network processor 120 may extract a feature from each of the reconstructed image data and the input image data and may perform a neural network operation based thereon. The neural network processor 120 may be trained to perform an image processing operation for generating a high-quality image.

The neural network processor 120 may be trained to perform at least one of image processing operations that are generally performed by the image sensor 111 of the camera module 110. Here, the image processing operations may include various operations, such as a bad pixel correction (BPC) operation, a lens shading correction (LSC) operation, an X-talk correction operation, a white balance (WB) correction operation, a remosaic operation, a demosaicing operation, a denoising operation, a deblurring operation, a gamma correction operation, a high dynamic range (HDR) operation, and a tone mapping operation. In addition, the type of image processing operation is not limited to the above-described examples.

The neural network processor 120 may receive the reconstructed image data generated by the pre-processor 130 and perform image processing operations on the reconstructed image data to generate output image data.

The memory 160 may include at least one of a volatile memory and a nonvolatile memory. The non-volatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FeRAM), and so on. The volatile memory may include dynamic RAM (DRAM), static RAM (SRAM), synchronous DRAM (SDRAM), PRAM, MRAM, RRAM, FeRAM, and so on. In an embodiment, the memory 160 may include at least one of a hard disk drive (HDD), a solid state drive (SSD), a compact flash (CF) card, a secure digital (SD) card, a micro secure digital (Micro-SD) card, a mini secure digital (Mini-SD) card, an extreme digital (xD) card, and a memory stick.

The display 170 may display various contents (for example, text, an image, a video, an icon, or a symbol) to a user based on output image data received from the neural network processor 120. For example, the display 170 may include a liquid crystal display (LCD), a light-emitting diode (LED) display, an organic light-emitting diode (OLED) display, or a microelectromechanical system (MEMS) display, or an electronic paper display. The display 170 may include a pixel array in which a plurality of pixels are arranged in a matrix to display an image.

Figure 2:
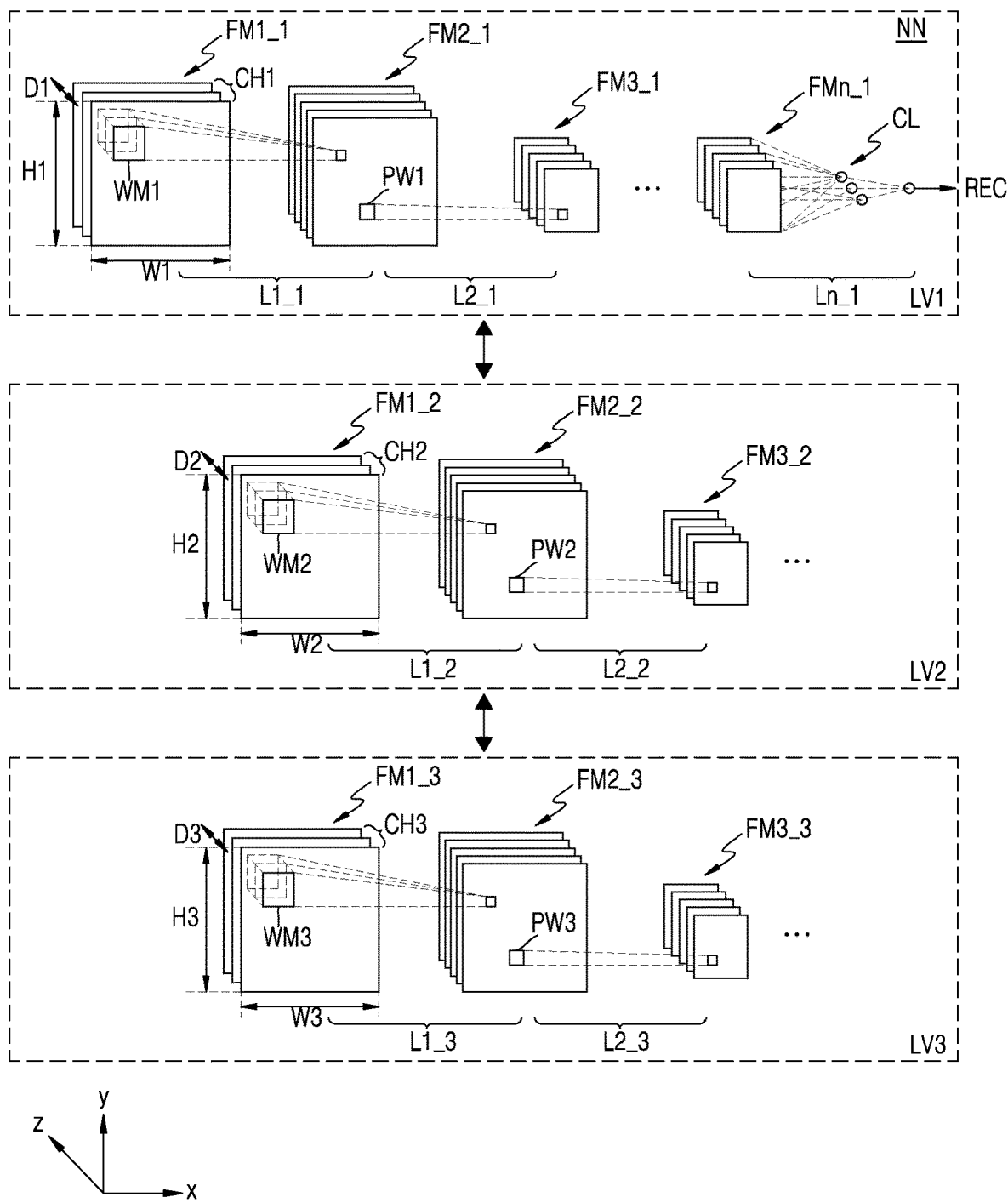
FIG. 2 is a diagram of a neural network structure according to an example embodiment.

FIG. 2 is a diagram of a neural network structure according to an example embodiment. A structure of a neural network NN of FIG. 2 may be applied to the neural network processor 120 of FIG. 1.

Referring to FIG. 2, the neural network NN may include a plurality of levels LV1 to LV3. However, the neural network NN is not limited thereto and may consist of only one level or may also include two or more levels. Hereinafter, a first level LV1 will be described, but the same may be applied substantially to other levels included in the neural network NN. In addition, some of layers in the first level LV1 may be omitted, or layers other than the layers described in the first level LV1 may be added to the neural network NN as needed.

The first level LV1 may include a plurality of layers L1_1 to Ln_1. A neural network having the multi-layered structure may be referred to as a deep neural network (DNN) or a deep learning architecture. Each of the plurality of layers L1_1 to Ln_1 may be a linear layer or a non-linear layer, and in an embodiment, at least one layer may overlap at least one non-linear layer to be referred to as one layer. For example, the linear layer may include a convolution layer and a fully connected layer, and the nonlinear layer may include a pooling layer and an activation layer.

For example, the first layer L1_1 may be a convolution layer, a second layer L2_1 may be a pooling layer, and an n-th layer Ln_1 may be a fully connected layer as an output layer. The neural network NN may further include an activation layer and may further include a layer for performing different types of operations.

Each of the plurality of layers L1_1 to Ln_1 may receive input image data or a feature map generated by a previous layer as an input feature map and may generate an output feature map by calculating the input feature map. In this case, the feature map may indicate data in which various characteristics of input data are expressed. Feature maps FM1_1 to FMn_1 may have, for example, a two-dimensional matrix or a three-dimensional matrix (or referred to as a tensor) including a plurality of feature values. Each of the feature maps FM1_1 to FMn_1 may have a width W1 (or referred to as a column), a height H1 (or referred to as a row), and a depth D1, which respectively correspond to the x-axis, the y-axis and the z-axis on coordinates. In this case, the depth D1 may be referred to as the number of channels CHL Although three channels CH1 is illustrated in FIG. 2, the disclosure is not limited thereto, and the number of channels CH1 may be one or more.

A first layer L1_1 may generate a second feature map FM2_1 by convoluting a first feature map FM1_1 with a weight map WM1. The weight map WM1 may have a form of a two-dimensional matrix or a three-dimensional matrix including a plurality of weight values. The weight map WM1 may be referred to as a kernel. The weight map WM1 may filter the first feature map FM1_1 and may be referred to as a filter or a kernel. A depth of the weight map WM1, that is, the number of channels, may be the same as a depth of the first feature map FM1_1. That is, the number of channels, and the same channels of the weight map WM1 and the first feature map FM1_1 may be convoluted. The weight map WM1 is shifted in a traversing manner by using the first feature map FM1_1 as a sliding window. During each shift, each of weights included in the weight map WM1 may be multiplied by and added to all feature values in a region overlapping the first feature map FM1_1. As the first feature map FM1_1 and the weight map WM1 are convoluted, one channel of the second feature map FM2_1 may be generated. Although one weight map WM1 is illustrated in FIG. 2, a plurality of weight maps are actually convoluted with the first feature map FM1_1 to generate a plurality of channels of the second feature map FM2_1. In other words, the number of channels of the second feature map FM2_1 may correspond to the number of weight maps.

The second layer L2_1 may generate a third feature map FM3_1 by changing a spatial size of the second feature map FM2_1 through pooling. The pooling may be referred to as sampling or down-sampling. A two-dimensional pooling window PW1 is shifted on the second feature map FM2_1 in units of the size of the pooling window PW1, and the greatest value (or an average value of the feature values) among the feature values of a region overlapping the pooling window PW1 may be selected. Accordingly, the third feature map FM3_1 having a spatial size changed from the second feature map FM2_1 may be generated. The number of channels of the third feature map FM3_1 may be the same as the number of channels of the second feature map FM2_1.

The n-th layer Ln_1 may classify a class CL of input data by combining features of the n-th feature map FMn_1. In addition, a recognition signal RI corresponding to a class may be generated. The n-th layer Ln_1 may also be omitted as needed.

The neural network NN may include one level but may also include a plurality of levels. Each of the plurality of levels may receive a feature map generated from image data input to each level as an input feature map and may generate an output feature map or a recognition signal REC by calculating the input feature map. For example, the first level LV1 may receive a feature map generated from the input image data as the input feature map. The first layer L1_1 may receive the first feature map FM1_1 generated from the input image data. A second level LV2 may receive a feature map generated from the first reconstructed image data as the input feature map. The first layer L1_2 may receive a first feature map FM1_2 generated from the first reconstructed image data. A third level LV3 may receive a feature map generated from the second reconstructed image data as the input feature map. The first layer L1_3 may receive a first feature map FM1_3 generated from the second reconstructed image data. Units of the first reconstructed image data and the second reconstructed image data may be different from each other.

Widths W1, W2, and W3, heights H1, H2, and H3, and depths D1, D2, and D3 of the first feature map FM1_1, the first feature map FM1_2, and the first feature map FM1_3 may be different from each other. For example, the depth D1 of the first feature map FM1_1 may be 1, the depth D2 of the first feature map FM1_2 may be 4, and the depth D3 of the first feature map FM1_3 may be 16. That is, the number of channels of the first feature map FM1_1, the first feature map FM1_2, and the first feature map FM1_3 may be different from each other.

A plurality of levels may be organically connected to each other. For example, a feature map output from a layer included in each of the plurality of levels may be organically connected to a feature map of another level. For example, the neural network NN may perform an operation for extracting characteristics of the third feature map 3_1 and the first feature map FM1_2 to generate a new feature map. In one embodiment, the n-th layer Ln_1 may exist in only one level, and the class CL of input data may be classified by combining features of a feature map of each level.

In some embodiments, the neural network NN may be based on U-Net. The U-Net may include an end-to-end fully convolutional network. In one embodiment, the U-Net may include convolution layers, bilinear upsampling layers, average layers, and attention layers.

Figure 3:
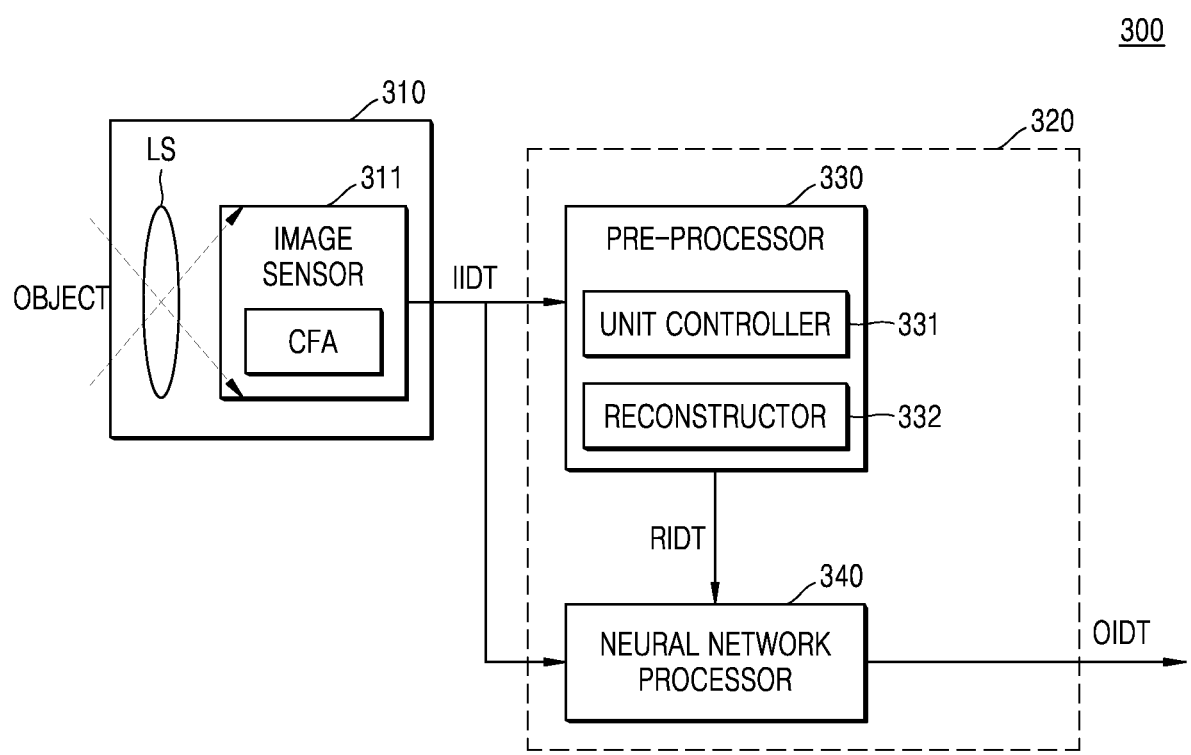
FIG. 3 is a block diagram illustrating an image processing apparatus according to an example embodiment.

FIG. 3 is a block diagram illustrating an image processing apparatus according to an example embodiment. In detail, FIG. 3 is a diagram illustrating an embodiment in which the neural network system 100 of FIG. 1 is implemented by an image processing apparatus 300.

The image processing apparatus 300 may be implemented by an electronic device that captures an image and displays the captured image or performs an operation based on the captured image. The image processing apparatus 300 may be implemented by, for example, a personal computer (PC), an IoT device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), a moving picture experts group (MPEG) audio layer-3 (MP3) player, a handheld game console, an e-book, a wearable device, and so on. In addition, the image processing apparatus 300 may be mounted on an electronic device, such as a drone or an ADAS, or an electronic device provided as a component in a vehicle, furniture, a manufacturing facility, a door, various measurement devices, or so on.

Referring to FIG. 3, the image processing apparatus 300 may include a camera module 310 and an image processing system 320. The image processing apparatus 300 may further include other components, such as a display and a user interface. The image processing system 320 may include a pre-processor 330 and a neural network processor 340. The camera module 310, the pre-processor 330, and the neural network processor 340 may respectively correspond to the camera module 110, the pre-processor 130, and the neural network processor 120 of FIG. 1, and thus, redundant descriptions thereof are omitted. Although FIG. 3 illustrates that the image processing apparatus 300 includes the camera module 310 and the image processing system 320, the image processing apparatus 300 may not include the camera module 310 as needed, and the camera module 310 and the image processing system 320 may be implemented in separate semiconductor chips.

The pre-processor 330 and the neural network processor 340 may be implemented in a single semiconductor chip or a plurality of semiconductor chips. Furthermore, the image processing system 320 or the image processing apparatus 300 may be implemented as an SoC.

An image sensor 311 of the camera module 310 may include a color filter array CFA having a predetermined pattern and convert an optical signal of an object incident through an optical lens LS into an electrical signal by using the color filter array CFA and generate input image data IIDT based on the electrical signal and output the input image data IIDT. In an example embodiment, the color filter array CFA may be implemented in a Bayer pattern in which 2×2 cells including a red pixel, a blue pixel, and two green pixels are repeatedly arranged. Alternatively, the color filter array CFA may be implemented in a tetra pattern in which 4×4 cells including four red pixels, four blue pixels, and eight green pixels are repeatedly arranged. Alternatively, the color filter array CFA may be implemented in a Nona pattern in which 6×6 cells including nine red pixels, nine blue pixels, and 18 green pixels are repeatedly arranged. In addition, the pattern types of the color filter array CFA are not limited to the examples described above, and the color filter array CFA may have a pattern in which cells of larger sizes are repeatedly arranged.

The image sensor 311 may include, for example, a pixel array including a plurality of two-dimensionally arranged pixels and a readout circuit, and the pixel array may convert received optical signals into electrical signals. The pixel array may be implemented by, for example, a photoelectric conversion device, such as a charge coupled device (CCD) or a complementary metal oxide semiconductor (CMOS), and may be implemented by various types of photoelectric conversion devices. The readout circuit may generate raw data based on an electrical signal provided from the pixel array and output noise-removed raw data as the input image data IIDT. The image sensor 311 may be implemented by a semiconductor chip or package including the pixel array and the readout circuit.

The input image data IIDT may have a pattern corresponding to a filter array. Specifically, the input image data IIDT may have a pattern, which corresponds to the type of the color filter array CFA included in the image sensor 311, such as an RGB pattern, an RGB green (RGBG) pattern, an RGBW pattern, a tetra pattern, and a nona pattern. The RGB pattern may represent a pattern having a structure in which red, green, and blue pixel values are repeated, the RGBG pattern may represent a pattern in which red, green, blue, and green pixel values are repeated, and the RGBW pattern may represent a pattern in which red, green, blue, and white pixel values are repeated. However, the patterns of the input image data IIDT are not limited to the types described above.

The pre-processor 330 may include a unit controller 331 and a reconstructor 332. The pre-processor 330 may receive the input image data IIDT and generate reconstructed image data RIDT for the input image data IIDT. The pre-processor 330 may generate the input image data IIDT as the reconstructed image data RIDT, based on phase information and a pattern.

The unit controller 331 may determine a unit of the reconstructed image data RIDT based on a pattern of the input image data IIDT. The pattern of the input image data IIDT may correspond to the type of the color filter array CFA, and a unit of the reconstructed image data RIDT may be determined by the pattern.

In one embodiment, the unit controller 331 may determine the unit of the reconstructed image data RIDT to have a smaller unit than the pattern of the input image data IIDT. For example, when the pattern of the input image data IIDT is a tetra pattern having a size of 4×4 cells, the unit controller 331 may determine at least one of 2×2 cells and 1×1 cells smaller than 4×4 cells as units of the reconstructed image data RIDT.

The unit controller 331 may determine that the reconstructed image data RIDT has several units. The reconstructed image data RIDT of several units may be generated according to a pattern of input image data IIDT. For example, when the pattern of the input image data IIDT is a tetra pattern having a size of 4×4 cells including four red pixels, four blue pixels, and eight green pixels, the unit controller 331 may determine the unit of the reconstructed image data RIDT to be 2×2 cells and a 1×1 cell. In another example, when the pattern of the input image data IIDT is a pattern having a size of 2×2 cells, the unit controller 331 may determine the unit of the reconstructed image data RIDT to be a 1×1 cell.

The reconstructor 332 may reconstruct the input image data IIDT based on phase information corresponding to each of the plurality of pixels included in the image sensor 311. Optical signals received by the plurality of pixels may be converted into electrical signals to generate image data corresponding to each of the plurality of pixels, and the image data may include a phase element in a frequency domain. The phase information corresponding to each of the plurality of pixels may indicate the phase element of the image data corresponding to each of the plurality of pixels.

The reconstructor 332 may reconstruct the input image data IIDT based on the unit determined by the unit controller 331 and the phase information and output the reconstructed image data RIDT. For example, when the unit controller 331 determines the unit of the reconstructed image data RIDT to be 2×2 cells and a 1×1 cell for the input image data IIDT having a size of 4×4 cells, the reconstructor 332 may generate first reconstructed image data of four channels having a size of 2×2 cells. The reconstructor 332 may classify image data including the same or similar phase elements to reconstruct the image data to have a size of 2×2 cells. Image data belonging to different channels of the first reconstructed image data may include different types of phase information. The reconstructor 332 may generate second reconstructed image data of 16 channels having a size of a 1×1 cell. The reconstructor 332 may classify image data including the same phase element to reconstruct the image data to a size of a 1×1 cell. The first reconstructed image data and the second reconstructed image data may be input to the neural network processor 340.

The pre-processor 330 may perform a pre-processing operation on the input image data IIDT. For example, the pre-processing operation may include at least one of a BPC operation, an LSC operation, a crosstalk correction operation, a WB correction operation, and so on. The pre-processor 330 may transmit, to the neural network processor 340, the reconstructed image data RIDT generated by performing a pre-processing operation and a reconstruction operation. According to an embodiment, the pre-processor 330 may perform the reconfiguration operation without the pre-processing operation.

The neural network processor 340 according to an example embodiment may generate output image data OIDT by performing at least one image processing operation on the input image data IIDT and the reconstructed image data RIDT. The neural network processor 340 may be trained to perform at least one of a remosaic operation, a demosaicing operation, a denoising operation, a deblurring operation, an HDR operation, and a tone mapping operation. However, the image processing operation is not limited to the examples described above.

In one embodiment, the neural network processor 340 may receive the input image data IIDT and the reconstructed image data RIDT and perform a remosaic operation and a demosaicing operation on the input image data IIDT and the reconstructed image data RIDT to generate the output image data OIDT having a different pattern from the input image data IIDT The output image data OIDT may have an RGB pattern. Specifically, the neural network processor 340 may convert the input image data IIDT into RGB data composed of red, blue, and green channels. In addition, the disclosure is not limited thereto, and according to an embodiment, the input image data IIDT may be converted into YUV data. Y may indicate a brightness (luma) value, and U and V may indicate a color (chroma) value.

The image processing apparatus 300 according to an embodiment may generate the reconstructed image data RIDT from the input image data IIDT, based on phase information and a pattern. The neural network processor 340 may be trained by using the reconstructed image data RIDT classified based on the phase information as input data and may perform image processing operations. Because phase elements of the input image data IIDT are classified, the performance of the neural network processor 340 may be improved, and the image processing apparatus 300 may generate a high-resolution and high-quality image.

Figure 4:
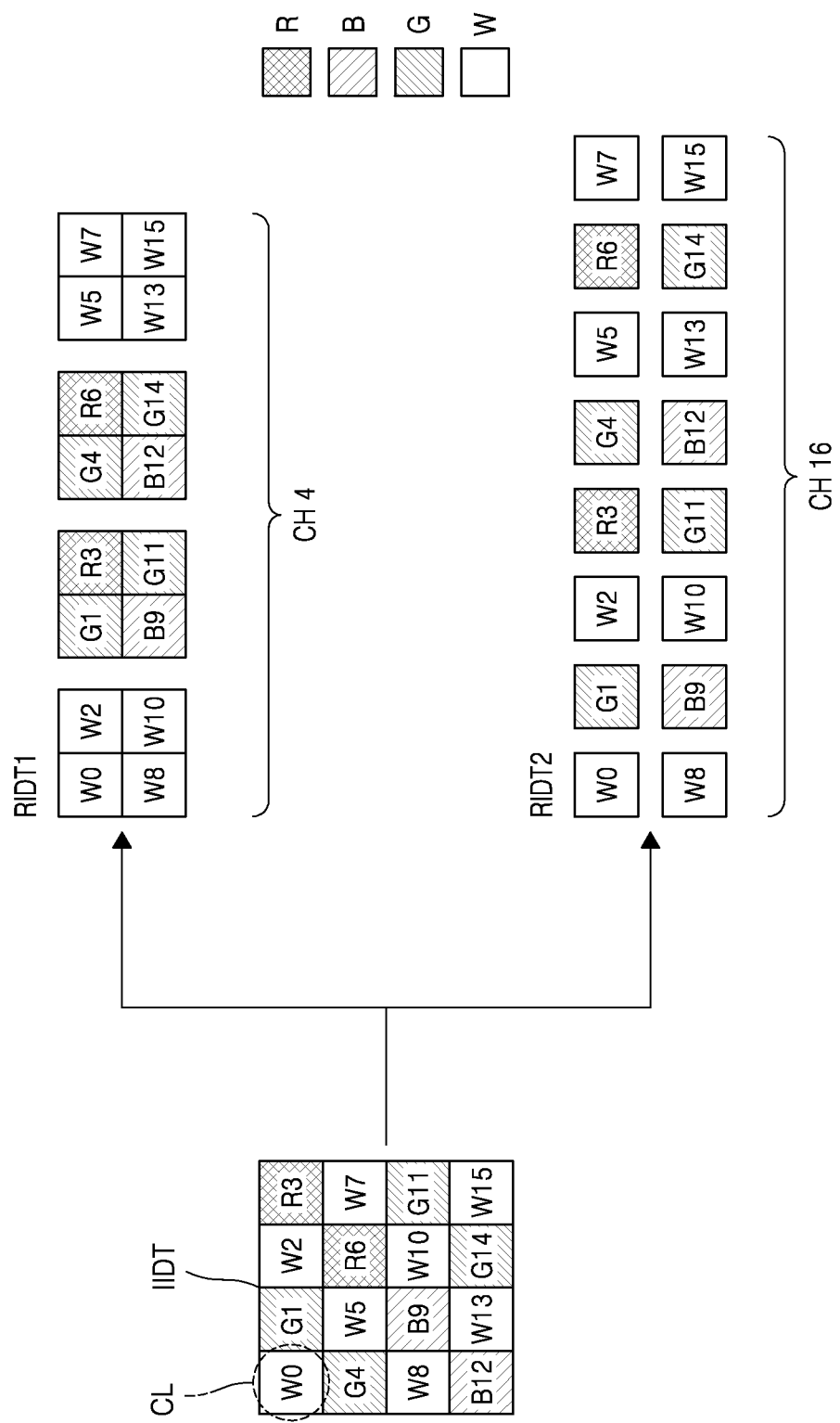
FIGS. 4 and 5 are diagrams illustrating an operation of a pre-processor according to an example embodiment.
Figure 5:
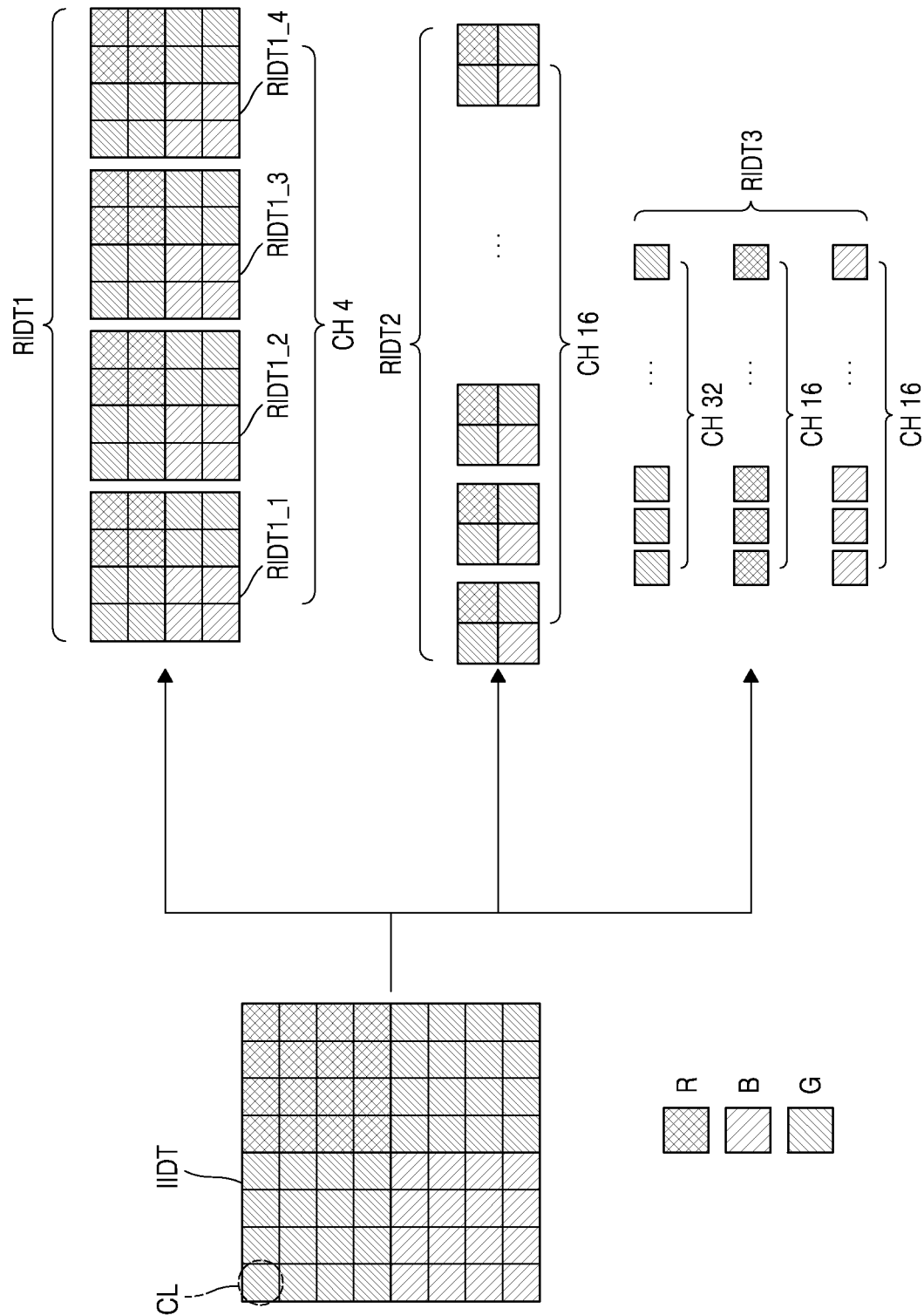

FIGS. 4 and 5 are diagrams illustrating an operation of the pre-processor according to an example embodiment.

Referring to FIG. 4, the input image data IIDT may include image data that is received by a pre-processor (for example, the pre-processor 330 of FIG. 3) and a neural network processor (for example, the neural network processor 340 of FIG. 3).

The input image data IIDT may have a pattern corresponding to the type of the color filter array CFA included in an image sensor (for example, the image sensor 311 of FIG. 3). FIG. 4 illustrates that the input image data IIDT has a red green blue white (RGBW) pattern having a structure in which red, green, blue, and white pixel values are repeated, but a pattern of the input image data IIDT is not limited thereto. The input image data IIDT may have various patterns. For example, the input image data IIDT may have a tetra pattern. In another example, the input image data IIDT may have various patterns, such as a Bayer pattern, a red green blue emerald (RGBE) pattern, a cyan yellow yellow magenta (CYYM) pattern, and a cyan yellow cyan magenta (CYCM) pattern.

The input image data IIDT may be composed of a plurality of cells CL. The cell CL may be one unit of data obtained by the image sensor. For example, the cell CL may include image data obtained by one pixel circuit that is included in an image sensor and includes one color filter. The cell CL may include a phase element in a frequency domain. Phase information corresponding to a pixel may indicate a phase element of image data obtained by a pixel. The cell CL may express one color, for example, one of red, green, and blue. In addition, the colors are not limited to red, green, and blue as described above and may be implemented in various colors, such as magenta, cyan, yellow, and white. As illustrated in FIG. 4, the pattern of the input image data IIDT may have a size of 4×4 cells. That is, the unit of the pattern of the input image data may be 4×4 cells. However, the unit of the input image data is not limited thereto.

The pre-processor may generate the input image data IIDT as reconstructed image data having a unit smaller than a pattern. The pre-processor may determine the unit of the reconstructed image data RIDT to have a unit smaller than 4×4 cells, which is the unit of the pattern of the input image data IIDT. The pre-processor may determine at least one of the 2×2 cells and the 1×1 cell as the unit of the reconstructed image data RIDT.

The pre-processor may reconstruct the input image data IIDT based on the determined unit. When a plurality of units smaller than the pattern of the input image data IIDT are used, the pre-processor may determine a plurality of units and generate reconstructed image data according to each of the plurality of units. That is, the pre-processor may determine 2×2 cells and a 1×1 cell, which are units smaller than 4×4 cells, as units of the reconstructed image data RIDT, may generate first reconstructed image data RIDT1 from image data of a unit of 2×2 cells of four channels, may generate second reconstructed image data RIDT2 from image data of a unit of a 1×1 cell of 16 channels.

The pre-processor may generate reconstructed image data based on phase information and a pattern. The pre-processor may reconstruct the determined unit by classifying a plurality of cells, which are included in the input image data IIDT, having phase elements, which are partially the same as or similar to each other. For example, when the unit of the reconstructed image data is determined to be 2×2 cells, the pre-processor may classify cells W0, W2, W8, and W10 having phase elements, which are partially the same as or similar to each other, to generate image data of a unit of 2×2 cells. The pre-processor may classify cells G1, R3, B9, and G11 having phase elements, which are partially the same as or similar to each other, to generate image data of a unit of 2×2 cells. The pre-processor may classify cells G4, R6, B12, and G14 having phase elements, which are partially the same as or similar to each other, to generate image data of a unit of 2×2 cells. The pre-processor may classify cells W5, W7, W13, and W15 having phase elements, which are partially the same as or similar to each other, to generate image data of a unit of 2×2 cells. The pre-processor may generate the first reconstructed image data RIDT1, which is image data of a unit of 2×2 cells of 4 channels, from the input image data IIDT.

In addition, when the unit of the reconstructed image data is determined to be a 1×1 cell, the pre-processor may classify the input image data IIDT having all the same phase element. When the input image data IIDT is classified to have the same phase element, each cell may be classified. The pre-processor may set each of the cells W0, W2, W8, W10, G1, R3, B9, G11, G4, R6, B12, G14, W5, W7, W13, and W15 as image data of a unit of a 1×1 cell. Phase elements of the cells W0, W2, W8, W10, G1, R3, B9, G11, G4, R6, B12, G14, W5, W7, W13, and W15 may not be the same as each other. The pre-processor may generate the second reconstructed image data RIDT2, which is image data of a unit of a 1×1 cell of 16-channels, from the input image data IIDT.

Referring to FIG. 5, the input image data IIDT may have a pattern corresponding to the type of a color filter array included in an image sensor. FIG. 5 illustrates that the input image data IIDT has a tetra-square pattern in which 8×8 cells including 16 red pixels, 16 blue pixels, and 32 green pixels are repeatedly arranged, but the pattern of the input image data IIDT is not limited thereto. The input image data IIDT may have various patterns.

The input image data IIDT may include a plurality of cells CL. The cell CL may include image data obtained by one pixel circuit that is included in an image sensor and includes one color filter. The cell CL may include a phase element in a frequency domain. A pattern of the input image data IIDT may have a size of 8×8 cells. That is, the unit of the pattern of the input image data IIDT may be 8×8 cells. However, the unit of the input image data IIDT is not limited thereto.

The pre-processor may generate reconstructed image data having a unit smaller than a pattern from the input image data IIDT. The pre-processor may determine a unit of the reconstructed image data RIDT to have a unit smaller than 8×8 cells, which is the unit of the pattern of the input image data IIDT. The pre-processor may determine at least one of 4×4 cells, 2×2 cells, and a 1×1 cell as the unit of the reconstructed image data RIDT.

The pre-processor may reconstruct the input image data IIDT based on the determined unit. When a plurality of units smaller than the pattern of the input image data IIDT are used, the pre-processor may determine a plurality of units and generate reconstructed image data according to each of the plurality of units. That is, the pre-processor may determine 4×4 cells, 2×2 cells, and a 1×1 cell, which are smaller than 8×8 cells, as units of the reconstructed image data RIDT. The pre-processor may generate the first reconstructed image data RIDT1, which is image data of a unit of 4×4 cells of four channels, generate the second reconstructed image data RIDT2, which is image data of a unit of 2×2 cells of 16 channels, and generate third reconstructed image data RIDT3 that is image data of a unit of a 1×1 cell of 64 channels.

The pre-processor may generate reconstructed image data based on phase information and a pattern. When the unit of the reconstructed image data is determined to be 4×4 cells, the pre-processor may generate image data RIDT1_1 of a unit of 4×4 cells, image data RIDT1_2 of a unit of 4×4 cells, image data RIDT1_3 of a unit of 4×4 cells, and image data RIDT1_4 of a unit of 4×4 cells. Cells included in the image data RIDT1_1 may have phase elements, which are partially the same as or similar to each other. Similarly, cells included in each of the image data RIDT1_2, the image data RIDT1_3, and the image data RIDT1_4 may have phase elements, which are partially the same as or similar to each other. The pre-processor may generate the first reconstructed image data RIDT1, which is image data of a unit of 4×4 cells of four channels, from the input image data IIDT.

In addition, when the unit of the reconstructed image data is determined to be 2×2 cells, the pre-processor may generate image data of a unit of 2×2 cells. The similarity of phase elements of cells included in one unit of the second reconstructed image data RIDT2 may be higher than the similarity of phase elements of cells included in one unit of the first reconstructed image data RIDT1. The pre-processor may generate the second reconstructed image data RIDT2, which is image data of a unit of 2×2 cells of 16 channels, from the input image data IIDT.

The pre-processor may classify the input image data IIDT to have all the same phase element. When the input image data IIDT is classified to have the same phase element, each cell may be classified. The pre-processor may classify the input image data IIDT to generate image data of a unit of a 1×1 cell. The pre-processor may generate the third reconstructed image data RIDT3, which is image data of a unit of a 1×1 cell of 64 channels, from the input image data IIDT.

Figure 6:
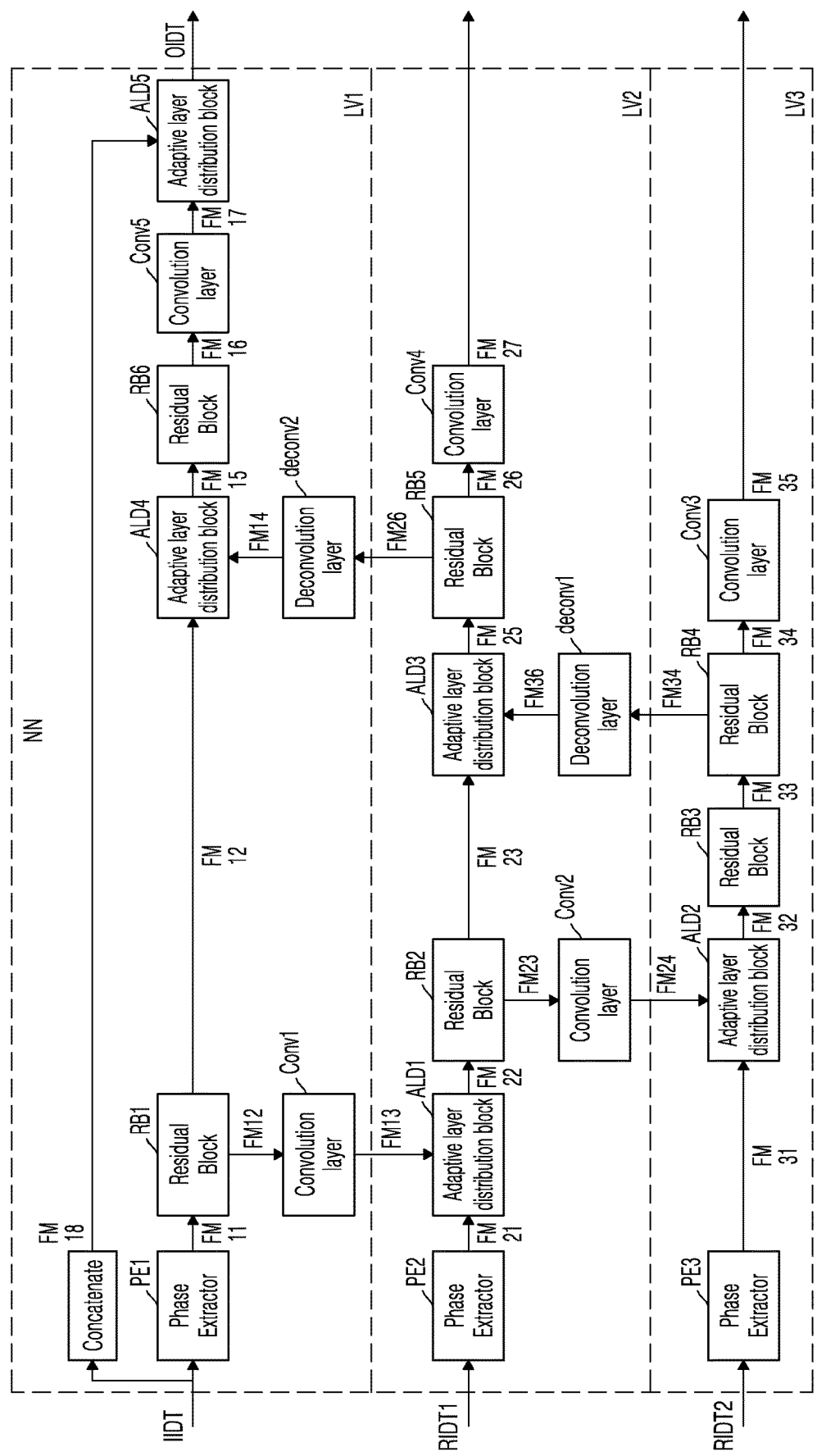
FIG. 6 is a diagram illustrating a neural network according to an example embodiment.

FIG. 6 is a diagram illustrating a neural network according to an example embodiment. A neural network NN of FIG. 6 may be applied to the neural network processor 340 of FIG. 3. The input image data IIDT and the reconstructed image data RIDT1 and RIDT2 of FIG. 6 respectively correspond to the input image data IIDT and the reconstructed image data RIDT1 and RIDT2 described with reference to FIG. 4, and thus, redundant descriptions thereof are omitted.

According to an embodiment, the neural network NN may perform image processing. The neural network NN may be trained to perform at least one of a remosaic operation, a demosaicing operation, a denoising operation, a deblurring operation, a gamma correction operation, an HDR operation, and a tone mapping operation.

The neural network NN may include a plurality of levels LV1 to LV3. Image data input to each of the plurality of levels LV1 to LV3 may be different from each other. Levels may be distinguished based on image data input to an input layer of each level. The input image data IIDT may be input to a first level LV1, the first reconstructed image data RIDT1 may be input to a second level LV2, and the second reconstructed image data RIDT2 may be input to a third level LV3. Although FIG. 6 illustrates that the neural network NN has three inputs and the three levels are described, the disclosure is not limited thereto, and the number of levels of the neural network NN may be changed.

Levels may be distinguished based on a unit of image data input to an input layer of each level. In one embodiment, a unit of image data input to the first level LV1 may be greater than a unit of image data input to the second level LV2, and the second level LV2 may correspond to a lower level than the first level LV1. For example, when the input image data IIDT having a size of 4×4 cells is input to the first level LV1 and the first reconstructed image data RIDT1 having a size of 2×2 cells is input to the second level LV2, the second level LV2 may correspond to a lower level than the first level LV1.

The reconstructed image data may be input to a lower level than a level to which the input image data IIDT is input. For example, because a unit of the first reconstructed image data RIDT1 is smaller than a unit of the input image data IIDT, the first reconstructed image data RIDT1 may be input to the second level LV2. The second level LV2 may correspond to a lower level than the first level LV1. The number of convolution operations and the number of residual operations on a feature corresponding to image data input to a lower level may be less than the number of convolution operations and the number of residual operations on a feature corresponding to image data input to an upper level.

The number of channels of image data input to the neural network NN may change depending on the image data. In one embodiment, the number of channels of the input image data IIDT input to the neural network NN may be different from the number of channels of the first reconstructed image data RIDT1 and the number of channels of the second reconstructed image data RIDT2. For example, the number of channels of the input image data IIDT may be 1, the number of channels of the first reconstructed image data RIDT1 may be 4, and the number of channels of the second reconstructed image data RIDT2 may be 16, but the number of channels thereof is not limited thereto.

The number of channels of the reconstructed image data may be greater than the number of channels of the input image data IIDT. The number of channels of the first reconstructed image data RIDT1 may be 4 that is greater than 1, which is the number of channels of the input image data IIDT. The number of channels of the second reconstructed image data RIDT2 may be 16 that is greater than 1, which is the number of channels of the input image data IIDT. The number of channels of the image data may change depending on units of the image data, and the smaller the unit of the image data, the greater the number of channels of the image data.

As not only one piece of input image data but also reconstructed image data obtained by classifying input image data based on phase information and a pattern are input to the neural network NN, the neural network NN may delicately extract characteristics of the input image data, and thus, image processing operations, such as a remosaic operation and a demosaicing operation, may be performed more easily.

The plurality of levels may be organically connected to each other. Feature maps output from a layer included in each of the plurality of levels may be organically connected to a feature map of another level. For example, the neural network NN may organically connect feature maps of different levels to each other through an adaptive layer distribution operation.

The neural network NN may include an input layer (IL), a phase extractor, a residual block, an adaptive layer distribution block, a convolution layer, a deconvolution layer, and a concatenate block. The neural network NN may receive the input image data IIDTA and the reconstructed image data RIDT1 and RIDT2 and may calculate feature values of the input image data IIDTA and the reconstructed image data RIDT1 and RIDT2 by the phase extractor, the residual block, the adaptive layer distribution block, the convolution layer, the deconvolution layer, and the concatenate block. For example, the neural network NN may receive input image data having a tetra pattern and reconstructed image data reconstructed therefrom and perform an operation for converting the data into an RGB image. A block may include a convolution layer, an activation layer, and so on.

According to an embodiment, a phase extractor PE1 is an input layer and may generate a feature map FM11 for the input image data IIDT. The input image data IIDT may be input to an input layer of the first level LV1. A residual block RB1 may perform a residual operation on the feature map FM11 and generate a feature map FM12. A convolution layer conv1 may receive the feature map FM12 and perform a convolution operation to generate a feature map FM13.

A phase extractor PE2 may generate a feature map FM21 for the first reconstructed image data RIDT1. The first reconstructed image data RIDT1 may be input to an input layer of the second level LV2. The feature map FM13 and the feature map FM21 may be input to an adaptation layer distribution block ALD1, and the adaptation layer distribution block ALD1 may perform an adaptation layer distribution operation to generate a feature map FM22. The adaptation layer distribution block ALD1 may extract weighted values respectively corresponding to the feature map FM13 and the feature map FM21, and an adaptive layer distribution operation for calculating a weighted sum of the feature map FM13 and the feature map FM21 may be performed based on the extracted weighted values. Weighted values may be differently applied to the feature map FM13 corresponding to a first level and the feature map FM21 corresponding to a second level by the adaptation layer distribution block ALD1. Characteristics of feature maps may be easily extracted by the adaptation layer distribution block ALD1. The adaptation layer distribution block ALD1 will be described below in detail with reference to FIG. 7. A residual block RB2 may perform a residual operation on the feature map FM22 to generate a feature map FM23. A convolution layer conv2 may receive the feature map FM23 and perform a convolution operation to generate a feature map FM24.

A phase extractor PE3 may generate a feature map FM31 for the second reconstructed image data RIDT2. The second reconstructed image data RIDT2 may be input to an input layer of the third level LV3. The feature map FM31 and the feature map FM24 may be input to an adaptation layer distribution block ALD2, and an adaptation layer distribution operation may be performed to generate a feature map FM32. The adaptive layer distribution block ALD2 may extract weighted values respectively corresponding to the feature map FM31 and the feature map FM24 and calculate a weighted sum of the feature map FM31 and the feature map FM24 based on the extracted weighted values. A residual block RB3 may perform a residual operation on the feature map FM32 to generate a feature map FM33. A residual block RB4 may perform a residual operation on the feature map FM33 to generate a feature map FM34. A convolution layer conv3 may receive the feature map FM34 and perform a convolution operation to generate a feature map FM35. In one embodiment, the feature map FM35 may be input to an image signal processor and may be used to increase quality of the output image data OIDT.

A deconvolution layer deconv1 may receive the feature map FM34 and perform a deconvolution operation to generate a feature map FM36. An adaptive layer distribution block ALD3 may extract weighted values respectively corresponding to the feature map FM23 and the feature map FM36 and calculate a weighted sum of the feature map FM23 and the feature map FM36 based on the extracted weighted values. A feature map FM25 may be generated by the adaptation layer distribution block ALD3. A residual block RB5 may perform a residual operation on the feature map FM25 to generate a feature map FM26. A convolution layer conv4 may receive the feature map FM26 and perform a convolution operation to generate a feature map FM27. In an embodiment, the feature map FM27 may be input to an image signal processor and may be used to increase quality of the output image data OIDT.

A deconvolution layer deconv2 may receive the feature map FM26 and perform a deconvolution operation to generate a feature map FM14. An adaptive layer distribution block ALD4 may extract weighted values respectively corresponding to the feature map FM14 and the feature map FM12 and calculate a weighted sum of the feature map FM14 and the feature map FM12 based on the extracted weighted values. A feature map FM15 may be generated by the adaptation layer distribution block ALD4. A residual block RB6 may perform a residual operation on the feature map FM15 to generate a feature map FM16. A convolution layer conv5 may receive the feature map FM16 and perform a convolution operation to generate a feature map FM17. An adaptive layer distribution block ALD5 may extract weighted values respectively corresponding to the feature map FM17 and a feature map FM18 obtained by performing a concatenate operation on the input image data IIDT and calculate a weighted sum of the feature map FM17 and the feature map FM18 based on the extracted weighted values. The output image data OIDT may be generated by the adaptation layer distribution block ALD5. In an embodiment, the output image data OIDT may be input to an image signal processor. The size of the output image data OIDT may be different from the feature map FM27 and the feature map FM35.

Figure 7:
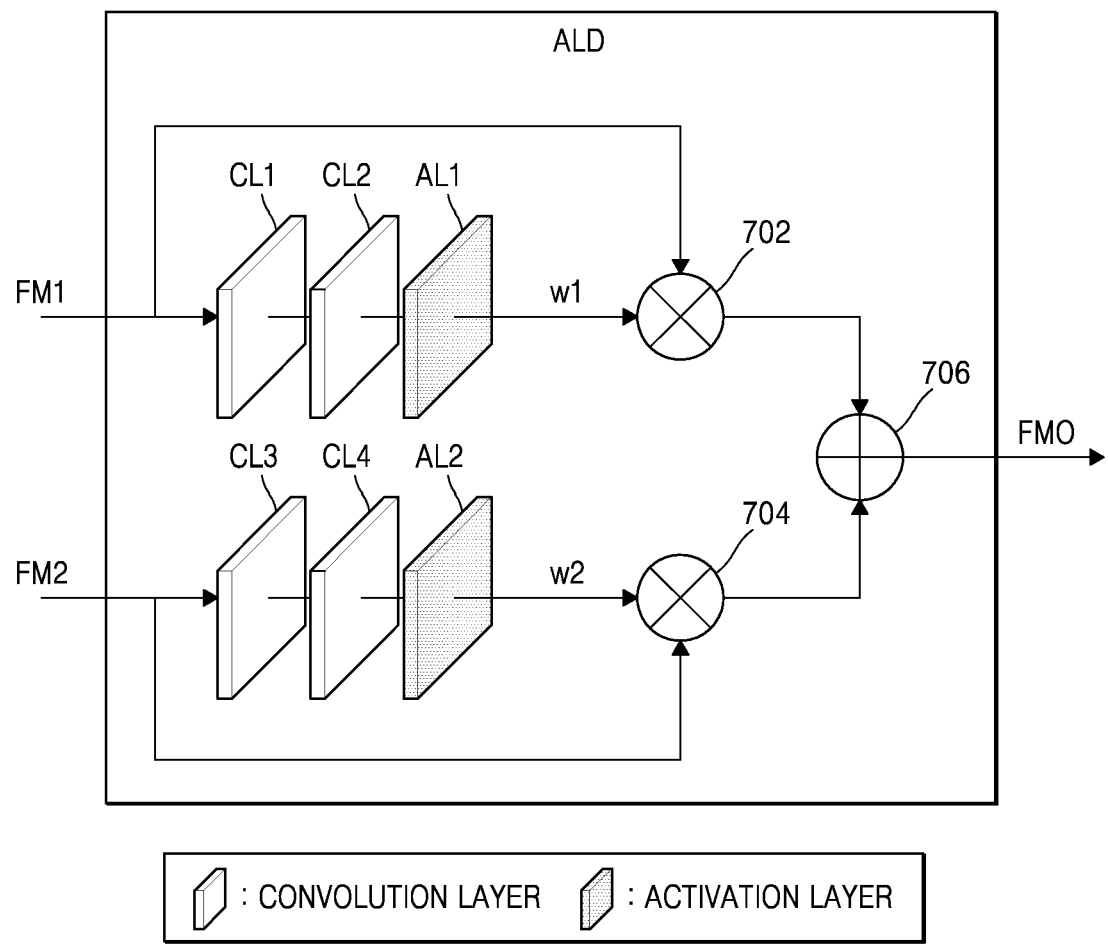
FIG. 7 is a diagram illustrating an adaptation layer distribution block according to an example embodiment.

FIG. 7 is a diagram illustrating an adaptation layer distribution block according to an example embodiment. An adaptation layer distribution block ALD of FIG. 7 corresponds to the adaptation layer distribution block described with reference to FIG. 6, and thus, redundant descriptions thereof are omitted.

Referring to FIG. 7, the adaptation layer distribution block ALD may include a plurality of layers, a first multiplier 702, a second multiple 704, and an adder 706. For example, the plurality of layers may include a plurality of convolution layers and a plurality of activation layers.

According to an embodiment, the adaptation layer distribution block ALD may receive a first feature map FM1 and a second feature map FM2. The first feature map FM1 and the second feature map FM2 may be feature maps that are input to different levels or output from a previous layer. The adaptation layer distribution block ALD may extract a weighted value based on each of the first feature map FM1 and the second feature map FM2.

The adaptive layer distribution block ALD may extract weighted values respectively corresponding to feature maps from the feature maps corresponding to image data input to each of a plurality of levels. The feature map corresponding to the image data may indicate a feature map generated from the image data. For example, the adaptation layer distribution block ALD may extract a first weighted value w1 corresponding to the first feature map FM1 from the first feature map FM1 corresponding to input image data. The adaptation layer distribution block ALD may extract a second weighted value w2 corresponding to the second feature map FM2 from the second feature map FM2 corresponding to first reconstructed image data.

The adaptation layer distribution block ALD may include at least one convolution layer and at least one activation layer. For example, the adaptation layer distribution block ALD may include four convolution layers and two activation layers, but the number of convolution layers and the number of activation layers are not limited thereto. The convolution layer may perform a convolution operation on a feature map input to the convolution layer. The activation layer may perform an activation function operation on a feature map input to the activation layer. For example, the activation layer may perform an operation by using a rectified linear unit (ReLU) function or a sigmoid function.

The convolution operation and the activation function operation may be performed on each input of the adaptation layer distribution block ALD. The adaptation layer distribution block ALD may extract weighted values respectively corresponding to feature maps by performing the convolution operation and the activation function operation on the feature maps input to the adaptation layer distribution block ALD. The first feature map FM1 may be calculated by a first convolution layer CL1, a second convolution layer CL2, and a first activation layer AL1, and the first weighted value w1 may be generated thereby. The second feature map FM2 may be calculated by a third convolution layer CL3, a fourth convolution layer CL4, and a second activation layer AL2, and the second weighted value w2 may be generated thereby.

The adaptation layer distribution block ALD may calculate a weighted sum of the feature maps FM1 and FM2 based on the weighted values. The adaptation layer distribution block ALD may calculate the weighted sum of the feature maps FM1 and FM2 and output the weighted sum to a feature map FMO. The adaptation layer distribution block ALD may calculate a weighted value for each input and apply the calculated weighted value to each input. For example, as illustrated in FIG. 7, the first feature map FM1 may be multiplied, for example, with the first multiplier 702, by the first weighted value w1, the second feature map FM2 may be multiplied, for example, with the second multiplier 704 by the second weighted value w2, and the multiplied values may be summed, for example, by the adder 706. That is, an output of the adaptation layer distribution block ALD may be represented by Equation (1).

$$FMO = FM1 * w1 + FM2 * w2 \quad (1)$$

Example embodiments of the disclosure may extract weighted values respectively corresponding to feature maps from the feature maps input to each of a plurality of levels and apply the weighted values respectively corresponding to the feature maps to the feature maps. The performance of image processing may be improved by adjusting a weighted value according to the image data input to each level and reflecting the adjusted weighted value in the image processing.

Figure 8:
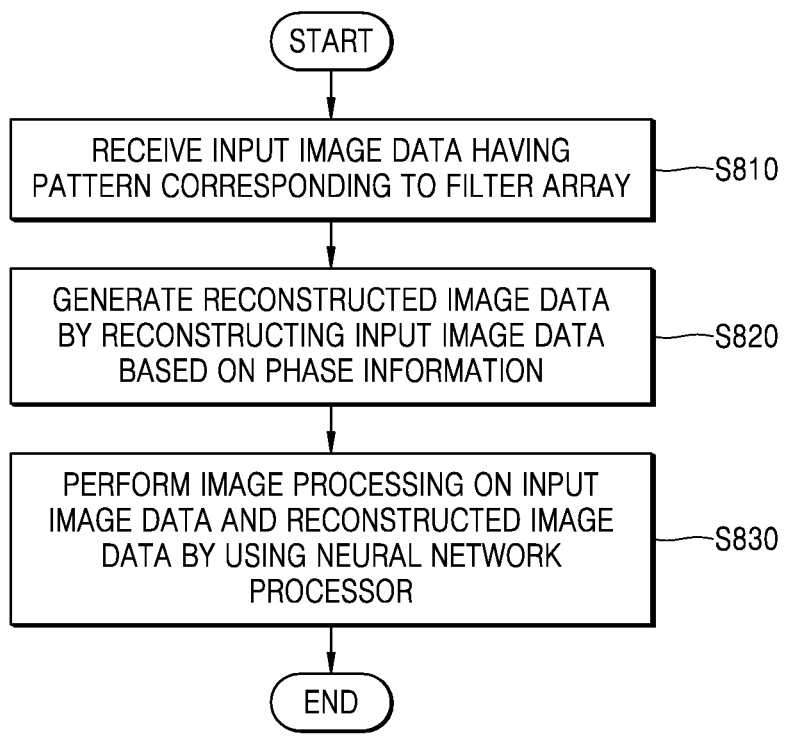
FIG. 8 is a flowchart illustrating an operating method of an image processing apparatus according to an example embodiment.

FIG. 8 is a flowchart illustrating an operating method of an image processing apparatus, according to an embodiment. In detail, FIG. 8 is a flowchart illustrating an operating method of the image processing system 320 described above with reference to FIG. 3.

In operation S810, the image processing apparatus may receive input image data having a pattern corresponding to a filter array. The image processing apparatus may receive the input image data from an image sensor. The image sensor may include a color filter array having a predetermined pattern, convert an optical signal into an electrical signal by using the color filter array, and generate and output the input image data based on the electrical signal. The input image data may have a pattern corresponding to the type of the color filter array, such as an RGB pattern, an RGBG pattern, an RGBW pattern, a tetra pattern, or a nona pattern. However, the pattern of the input image data is not limited to the types described above.

In operation S820, the image processing apparatus may reconstruct the input image data based on phase information corresponding to each of a plurality of pixels and generate reconstructed image data. Optical signals received by the plurality of pixels included in an image sensor may be converted into electrical signals to generate image data corresponding to each of the plurality of pixels, and the image data may include a phase element in a frequency domain. Phase information corresponding to each of the plurality of pixels may indicate a phase element of image data corresponding to each of the plurality of pixels.

Specifically, the image processing apparatus may determine a unit of the reconstructed image data based on a pattern of the input image data and determine the reconstructed image data based on the determined unit and phase information from the input image data. In one embodiment, the image processing apparatus may determine a unit of the reconstructed image data to have a smaller unit than a pattern of the input image data. For example, when the pattern of the input image data is a tetra pattern having a size of 4×4 cells, the image processing apparatus may determine at least one of 2×2 cells and a 1×1 cell smaller than 4×4 cells as a unit of the reconstructed image data.

The image processing apparatus may reconstruct the input image data based on the determined unit and the phase information and output the reconstructed input image data. For example, when the image processing apparatus determines the unit of the reconstructed image data to be 2×2 cells for the input image data having a size of 4×4 cells, the image processing apparatus may convert reconstructed image data of four channels having a size of 2×2 cells. The image processing apparatus may classify image data including the same phase element or similar phase elements and reconstruct the image data to a size of 2×2 cells.

In operation S830, the image processing apparatus may perform image processing on the input image data and the reconstructed image data by using a neural network processor. The image processing apparatus may perform image processing on the input image data and the reconstructed image data to generate output image data.

The neural network processor may be trained to perform at least one of a remosaic operation, a demosaicing operation, a denoising operation, a deblurring operation, an HDR operation, and a tone mapping operation. However, the image processing operation is not limited to the examples described above.

In an embodiment, the input image data and the reconstructed image data may be input to a neural network processor, and the neural network processor performs a re-mosaic operation and a demosaicing operation on the input image data and the reconstructed image data to obtain the input image data and the pattern. Therefore, it is possible to generate this different output image data.

Figure 9:
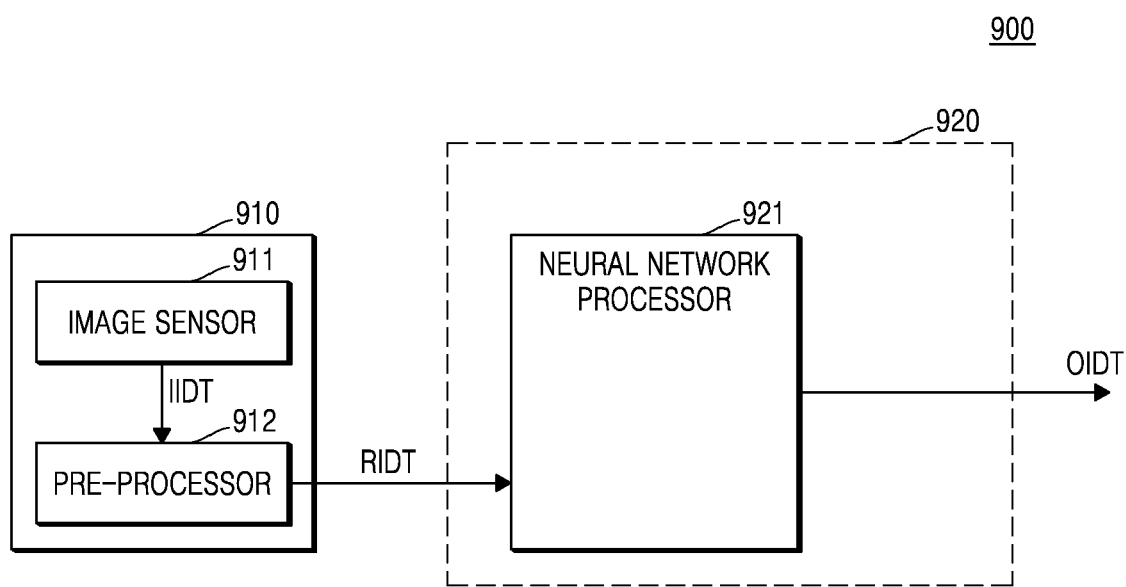
FIG. 9 is a block diagram illustrating an image processing apparatus according to an example embodiment.

FIG. 9 is a block diagram illustrating an image processing apparatus according to an example embodiment. In detail, FIG. 9 is a diagram illustrating a modifiable embodiment of the image processing apparatus 300 of FIG. 3. An image processing apparatus 900, a camera module 910, an image processing system 920, an image sensor 911, a pre-processor 912, and a neural network processor 921 of FIG. 9 respectively correspond to the image processing apparatus of FIG. 300, the camera module 310, the image processing system 320, the image sensor 311, the pre-processor 330, and the neural network processor 340, and thus, redundant descriptions thereof are omitted.

Referring to FIG. 9, the image processing apparatus 900 may include the camera module 910 and the image processing system 920. The camera module 910 may include the image sensor 911 and the pre-processor 912. The image processing system 920 may include the neural network processor 921.

Compared with the image processing apparatus 300 of FIG. 3, the image processing apparatus 900 of FIG. 9 may further include the pre-processor 912 in the camera module 910. The pre-processor 912 may generate reconstructed image data RIDT by performing pre-processing and a reconstruction operation on input image data IIDT generated by the image sensor 911. In addition, the pre-processor 912 may transmit the reconstructed image data RIDT to the neural network processor 921.

The neural network processor 921 according to an example embodiment may generate output image data OIDT by performing an image processing operation on the input image data IIDT and the reconstructed image data RIDT.

In addition, the disclosure is not limited thereto, and the camera module 910 may also include the neural network processor 921. The camera module 910 may include the pre-processor 912 and the neural network processor 921, and the neural network processor 921 may receive the reconstructed image data RIDT from the pre-processor 912 and perform an image processing operation. The camera module 910 may include the neural network processor 921, the image processing system 920 may include the pre-processor 912, and the neural network processor 921 may receive the reconstructed image data RIDT from the pre-processor 912 and perform an image processing operation.

As such, the image processing apparatus 900 according to the technical idea of the disclosure may be implemented such that at least one of the pre-processor 330 and the neural network processor 340 of FIG. 3 perform a function on the camera module 910 side.

Figure 10:
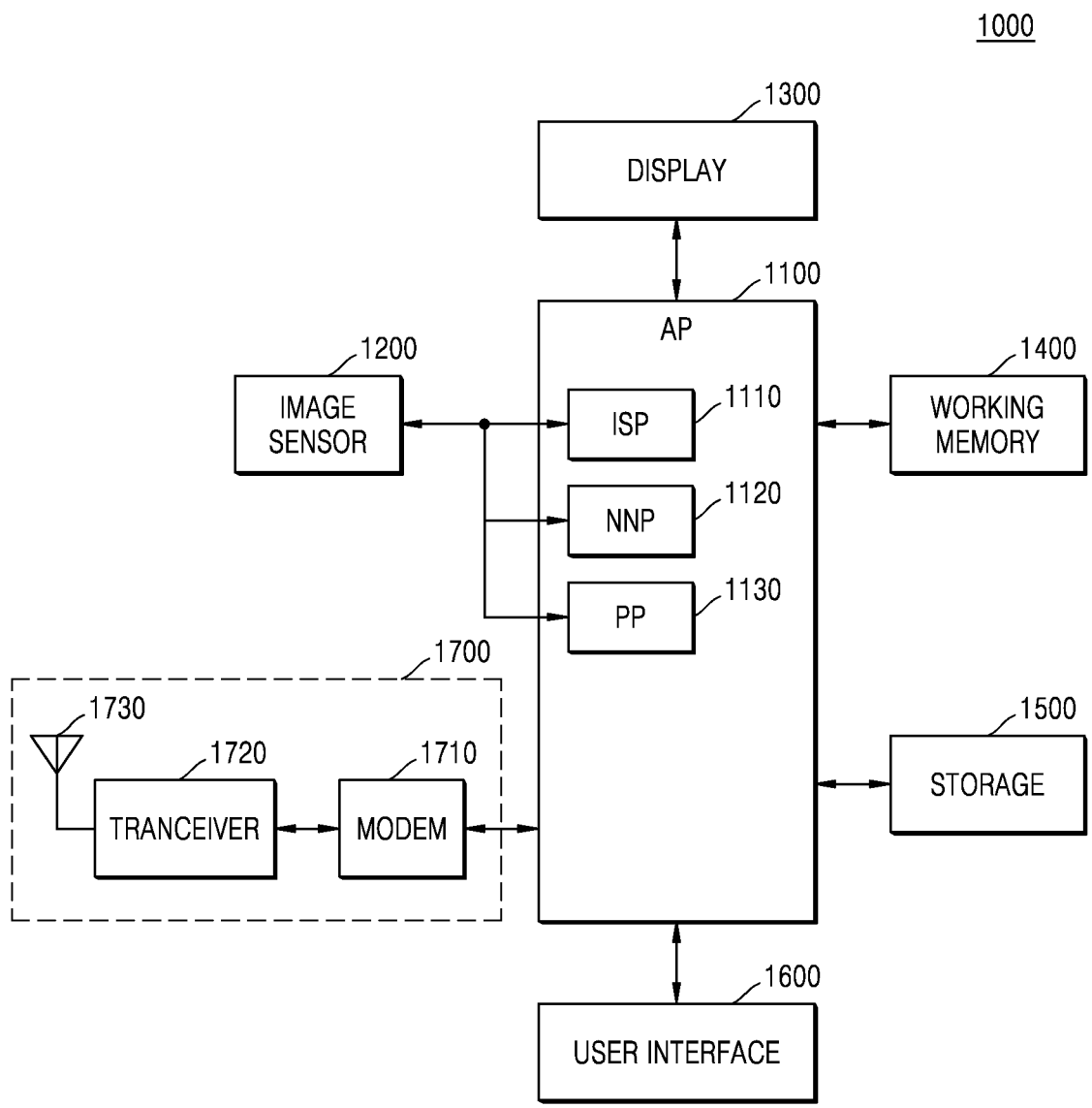
FIG. 10 is a block diagram illustrating an electronic device according to an example embodiment.

FIG. 10 is a block diagram illustrating an electronic device according to an example embodiment. For example, an electronic device 1000 may include a portable terminal.

Referring to FIG. 10, the electronic device 1000 according to the embodiment may include an application processor 1100, an image sensor 1200, a display 1300, a working memory 1400, a storage 1500, a user interface 1600, and a wireless transmission/reception unit 1700 may include, and the application processor 1100 may include an image signal processor 1110, a neural network processor 1120, and a pre-processor 1130. An image processing method according to embodiments of the disclosure described with reference to FIG. 1 and so on may be applied to the image signal processor 1110, the neural network processor 1120, and the pre-processor 1130. In an embodiment, the image signal processor 1110, the neural network processor 1120, and the pre-processor 1130 may be implemented by an integrated circuit separate from the application processor 1100.

The application processor 1100 may control all operations of the electronic device 1000 and may be implemented as an SoC that drives an application program, an operating system, and so on.

The application processor 1100 may control an operation of the image signal processor 1110 and may provide the converted image data generated by the image signal processor 1110 to the display 1300 or may store the converted image data in the storage 1500.

The image sensor 1200 may generate image data, for example, raw image data, based on the received optical signal and provide the image data to the image signal processor 1110.

The working memory 1400 may be implemented by a volatile memory such as DRAM or SRAM or a non-volatile resistive memory such as FeRAM, RRAM, or PRAM. The working memory 1400 may store programs and/or data processed or executed by the application processor 1100.

The storage 1500 may be implemented by a non-volatile memory device such as NAND flash or resistive memory, and the storage 1500 may be implemented by, for example, a memory card (a multi-media card (MMC), an embedded MMC (eMMC), an SD card, or a micro-SD card or so on. The storage 1500 may store a program and/or data for an execution algorithm for controlling an image processing operation of the image signal processor 1110, and when the image processing operation is performed, the data and/or the program may be loaded in the working memory 1400. In an embodiment, the storage 1500 may store image data, which is generated by the image signal processor 1110, for example, converted image data or post-processed image data.

The user interface 1600 may be implemented by various devices capable of receiving a user input, such as a keyboard, a curtain key panel, a touch panel, a fingerprint sensor, and a microphone. The user interface 1600 may receive a user input and provide a signal corresponding to the received user input to the application processor 1100.

The wireless transmission/reception unit 1700 may include a transceiver 1720, a modem 1710, and an antenna 1730.

At least one of the components, elements, modules or units (collectively "components" in this paragraph) represented by a block in the drawings such as FIGS. 1, 3, 6, 9 and 10 may be embodied as various numbers of hardware, software and/or firmware structures that execute respective functions described above. At least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

Example embodiments are disclosed in the drawings and specification as described above. Although embodiments are described by using specific terms in the present specification, these are only used for the purpose of describing the technical idea of the disclosure and do not limit the meaning or the scope of the disclosure described in the claims.

Therefore, it will be understood by those skilled in the art that various modifications and equivalent other embodiments may be made therefrom. Accordingly, the true technical protection scope of the disclosure should be defined by the technical idea of the appended claims.

While the disclosure has been particularly shown and described with reference to embodiments thereof, it will be understood that various changes in form and details may be made therein without departing from the spirit and scope of the following claims.

What is claimed is:

1. An image processing apparatus, comprising:
a pre-processor configured to:
receive, from an image sensor, input image data comprising a pattern corresponding to a filter array of the image sensor, and
generate reconstructed image data by reconstructing the input image data based on phase information corresponding to each of a plurality of pixels of the image sensor; and
a neural network processor configured to generate output image data based on the input image data and the reconstructed image data.

2. The image processing apparatus of claim 1, wherein the pre-processor configured to generate the reconstructed image data based on the phase information and the pattern corresponding to the filter array.

3. The image processing apparatus of claim 2, wherein the reconstructed image data comprises a smaller unit than the pattern corresponding to the filter array.

4. The image processing apparatus of claim 1, wherein the pre-processor is configured to generate the reconstructed image data by classifying input image data comprising the same phase information.

5. The image processing apparatus of claim 1, wherein the neural network processor is configured to perform at least one of a remosaic operation, a demosaicing operation, a denoising operation, a deblurring operation, a gamma correction operation, a high dynamic range operation, and a tone mapping operation.

6. The image processing apparatus of claim 1, wherein the neural network processor comprises a plurality of levels, and
wherein pieces of image data input to the each of the plurality of levels are different from each other.

7. The image processing apparatus of claim 6, wherein the reconstructed image data is input to a level of the plurality of levels that is lower than a level to which the pieces of input image data are input.

8. The image processing apparatus of claim 6, wherein the neural network processor comprises an adaptation layer distribution block, and
wherein the adaptation layer distribution block is configured to:
extract weighted values respectively corresponding to feature maps from the feature maps corresponding to the image data input to each of the plurality of levels, and
calculate a weighted sum of the feature maps based on the weighted values.

9. The image processing apparatus of claim 8, wherein the adaptation layer distribution block is configured to extract the weighted values by performing a convolution operation and an activation function operation on the feature maps.

10. The image processing apparatus of claim 1, wherein a number of channels of the input image data is different from a number of channels of the reconstructed image data.

11. The image processing apparatus of claim 10, wherein the number of channels of the reconstructed image data is greater than the number of channels of the input image data.

12. An image processing apparatus, comprising:
an image sensor comprising a plurality of pixels and a filter array, the image sensor configured to generate input image data comprising a pattern corresponding to the filter array;
a pre-processor configured to generate reconstructed image data by reconstructing the input image data based on phase information corresponding to each of the plurality of pixels and the pattern corresponding to the filter array; and
a neural network processor configured to generate output image data based on the input image data and the reconstructed image data,
wherein the pre-processor is further configured to:
determine a unit of the reconstructed image data based on the pattern corresponding to the filter array, and
generate the reconstructed image data comprising the determined unit based on the input image data.

13. The image processing apparatus of claim 12, wherein the unit of the reconstructed image data comprises a unit smaller than the pattern corresponding to the filter array.

14. The image processing apparatus of claim 12, wherein the pre-processor is configured to generate the reconstructed image data by classifying input image data comprising the same phase information.

15. The image processing apparatus of claim 12, wherein the neural network processor comprises a plurality of levels, and
wherein pieces of image data input to the each of the plurality of levels are different from each other.

16. The image processing apparatus of claim 15, wherein the reconstructed image data is input to a level of the plurality of levels that is lower than a level to which the pieces of input image data are input.

17. The image processing apparatus of claim 15, wherein the neural network processor comprises an adaptation layer distribution block, and
wherein the adaptation layer distribution block is configured to:
extract weighted values respectively corresponding to feature maps from feature maps corresponding to the image data input to each of the plurality of levels, and
calculate a weighted sum of the feature maps based on the weighted values.

18. The image processing apparatus of claim 12, wherein a number of channels of the input image data is different from a number of channels of the reconstructed image data.

19. An operating method of an image processing apparatus, the operating method comprising:
receiving input image data comprising a pattern corresponding to a filter array;
generating reconstructed image data by reconstructing the input image data based on phase information corresponding to each of the plurality of pixels; and
generating output image data based on the input image data and the reconstructed image data by using a neural network processor configured to perform preset image processing operations.

20. The operating method of claim 19, wherein the generating of the reconstructed image data comprises:
determining a unit of the reconstructed image data based on the pattern corresponding to the filter array; and generating the reconstructed image data based on the determined unit and the phase information from the input image data.

\* \* \* \* \*